F. POUNTNEY.
MEANS FOR GAGING THE DIAMETERS OF INTERNAL ANNULAR GROOVES.
APPLICATION FILED OCT. 31, 1918.
1,395,768.
Patented Nov. 1, 1921.
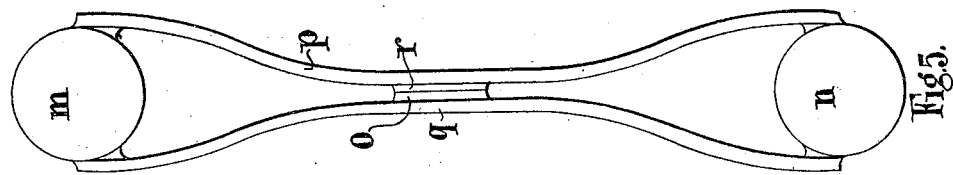
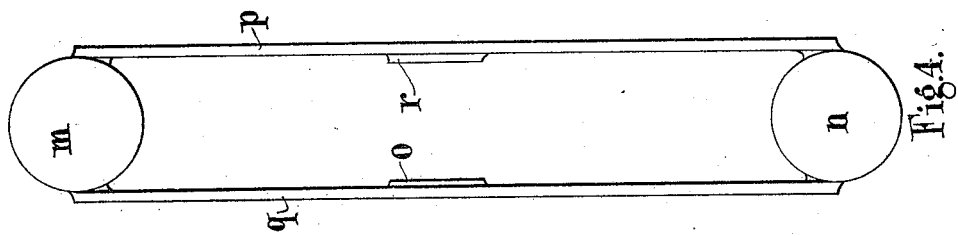
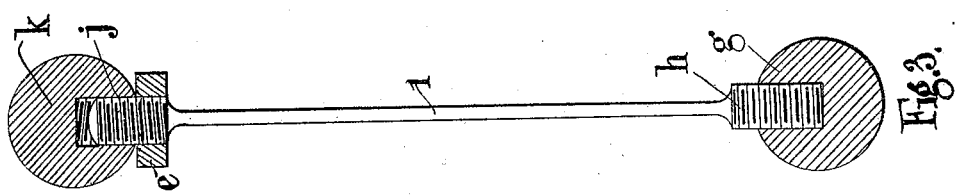
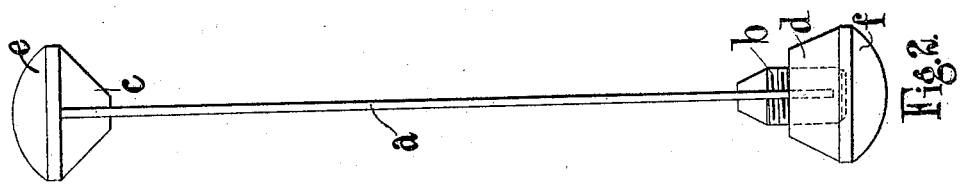
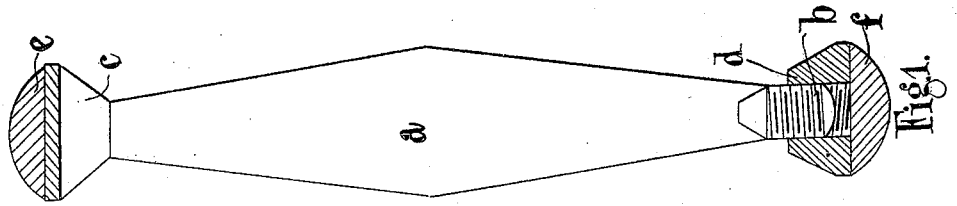
INVENTOR
F. Pountney.
BY H. R. Kerslake.
ATTORNEY

UNITED STATES PATENT OFFICE.

FRANK POUNTNEY, OF BIRMINGHAM, ENGLAND, ASSIGNOR TO RUDGE-WHITWORTH LIMITED, OF COVENTRY, WARWICK, ENGLAND.

MEANS FOR GAGING THE DIAMETERS OF INTERNAL ANNULAR GROOVES.

1,395,768.                Specification of Letters Patent.        Patented Nov. 1, 1921.

Application filed October 31, 1918. Serial No. 260,549.

*To all whom it may concern:*

Be it known that I, FRANK POUNTNEY, a subject of the King of Great Britain and Ireland, and residing at 567 Fox Hollies road, Hall Green, Birmingham, in the county of Warwick, England, have invented certain new and useful Improved Means for Gaging the Diameters of Internal Annular Grooves, of which the following is a specification.

This invention relates to gages for internal surfaces.

In gaging the diameters of internal grooves such as the grooves in outer elements of ball bearings, a difficulty presents itself, because the diameter to be gaged is greater than that of the surrounding parts through which the gage must pass and an ordinary gage made in one piece from an unyielding piece of metal cannot be used.

One object of this invention is to provide a gage to overcome this difficulty.

A further object is to provide a gage which shall be simple, efficient and inexpensive to manufacture.

The invention consists in a flexible deadlength gage for determining internal dimensions.

The invention further consists in a gage according to the preceding paragraph and having two adjacent longitudinal resilient members in which the transverse distance between said members when the gage is in position is utilized to determine the working tolerances which are permitted.

The invention further consists in a gage according to one or both of the preceding paragraphs which is originally provided with means for adjusting its exact length in position, such adjustment being then rendered incapable of alteration during ordinary use.

The invention further consists in a gage for internally grooved surfaces comprising a resilient member formed, say, of tempered sheet deflectable to permit of insertion and having two or more contacting gaging elements fastened thereto.

The invention further consists in a gaging means for the internal diameters of annular grooves as indicated in the preceding clause, in which the points of contact are formed of hard spherical or semi-spherical members soldered or otherwise attached to the flexible member, the last spherical or semi-spherical member being so attached while the gaging member is in position in a standard or sample groove made to exact size.

The invention also consists in improved gages and the like as hereinafter described.

Referring now to the accompanying drawings:—

Figures 1 and 2 show by way of example two views of one convenient form of gage in accordance with the invention.

Fig. 3 shows another way of carrying the invention into effect; and

Figs. 4 and 5 show a further modification.

In carrying the invention into effect as shown by way of example in Figs. 1 and 2, $a$ is a piece of flat steel tapering to each end and preferably tempered to such an extent that it is difficult to impart a permanent deflection thereto.

One end of the piece $a$ is inserted and firmly soldered in a slot in a screwed stud $b$, the other end entering and also being permanently soldered in a slot in the coned platform $c$.

The internally threaded platform $d$ is screwed upon the stud $b$ and to the two platforms $c$ and $d$ are soldered sections $e$, $f$ of hardened steel bearing balls.

In order to permanently set the length of the gage it is inserted in a standard or sample groove of the type for which it is to be employed, and the platform $d$ is screwed outward on the stud $b$ until the desired fit is obtained. The screwed joint between $b$ and $l$ is then soldered so that the length of the gage is permanently fixed and no alteration can be made therein during ordinary use.

In gaging an annular internal groove such as the race in the outer element of a ball bearing, two sized gages are required, the go-gage and the no-go-gage. When testing a perfect ring with the former, some slight endwise movement should be perceptible, but when testing it with the latter there would be no such movement, and the gage would remain in a slightly deflected state.

In the construction shown in Fig. 3 a complete ball or the greater portion thereof $g$ is attached and preferably soldered to the screwed end $h$ of a flattened and preferably tempered steel wire $i$, the opposite end of which is also screw-threaded at $j$ and provided with a second ball $k$ and lock-nut $l$. In this type the second ball $k$ is not necessarily soldered in position when set, but may depend upon the lock-nut for its permanent adjustment. A gage of this type can, therefore, be used for setting to a particular groove which is to be exactly duplicated or otherwise reproduced, and the gage can be readjusted where other grooves of slightly differing dimensions are to be copied. A gage of this construction may also have the threaded parts soldered when a fixed length is required.

In the construction shown in Figs. 4 and 5, balls $m$ and $n$ are fastened between two strips of thin flexible resilient material $q$ and $p$ which are provided upon their inner faces with stops $o$ and $r$, the distance between the stops being so arranged that when the strips are deflected so that the stops touch one another (as shown in Fig. 5), the length represents the go-gage, and when the strips are in their normal position (as shown in Fig. 4), the length corresponds with the no-go-gage.

Having now described my invention, what I claim as new and desire to secure by Letters Patent is:—

1. A gage for determining internal dimensions of bodies by the contact of diametrically opposite ends of said gage with the surface of the body, said gage including shaped contact pieces at each end and flexible connecting means which extends at least the greater part of the distance between said ends to permit of shortening said gage if required for insertion.

2. A gage for determining the internal dimensions of bodies, having in combination at least one intermediate flexible, resilient member and contact pieces adjustably secured to the ends of said member for contacting with the body to be measured and means for locking the said pieces to the member.

3. A gage for determining the internal dimensions of bodies, having in combination at least one intermediate flexible, resilient, longitudinal member, hardened steel contact pieces spherically shaped at least at their contacting portions secured as, for example, by soldering at the ends of said member, and means for finally locking one of the contact pieces when the gage is set to length, say in a standard groove.

4. A gage having in combination a longitudinal intermediate, flexible, resilient member, contact pieces attached to each of the ends of said member, means for permitting exact longitudinal adjustment of one of said contact pieces in relation to the member, and means for locking said piece to said member.

5. A gage for internally grooved surfaces, comprising an intermediate flexible, resilient member having a contact piece at each end thereof, an external thread upon at least one end of said member, a screw-threaded hole in at least one of said contact pieces into which the thread on the end of the resilient member is screwed, and a nut for locking the said contact piece and said member together.

In testimony whereof I have signed my name to this specification.

FRANK POUNTNEY.